United States Patent
Müller et al.

(10) Patent No.: US 9,500,236 B2
(45) Date of Patent: Nov. 22, 2016

(54) DRIVE DEVICE WITH OVERLOAD PROTECTION

(71) Applicant: Stabilus GmbH, Koblenz (DE)

(72) Inventors: Thomas Müller, Leuterod (DE);
Mathias Wieland, Koblenz (DE); Jörg Hillen, Nörtershausen (DE)

(73) Assignee: Stabilus GmbH, Koblenz (DE)

(*) Notice: Subject to any disclaimer, the term of this patent is extended or adjusted under 35 U.S.C. 154(b) by 0 days.

(21) Appl. No.: 14/249,473

(22) Filed: Apr. 10, 2014

(65) Prior Publication Data

US 2014/0309041 A1    Oct. 16, 2014

(30) Foreign Application Priority Data

Apr. 12, 2013 (DE) .................. 10 2013 206 538

(51) Int. Cl.
*F16D 7/02*    (2006.01)
*F16D 7/04*    (2006.01)
(Continued)

(52) U.S. Cl.
CPC ............ *F16D 7/024* (2013.01); *E05F 15/611* (2015.01); *F16D 7/044* (2013.01);
(Continued)

(58) Field of Classification Search
CPC ........ F16D 7/024; F16D 7/028; F16D 7/044; F16D 7/046; F16D 43/2022; F16D 43/2024; F16D 43/2026; F16D 43/213; E05Y 2201/216; E05Y 2201/238; E05Y 2201/72; E05Y 2900/546; F16H 35/10
USPC ............. 464/36, 38, 39, 43, 44, 46–48; 192/55.1, 56–56.62
See application file for complete search history.

(56) References Cited

U.S. PATENT DOCUMENTS 3,593,830 A * 7/1971 Clapp et al. .................. 464/39
3,613,751 A * 10/1971 Juhasz ......................... 464/36
(Continued)

FOREIGN PATENT DOCUMENTS

DE      9110953     2/1992
DE    102004006368  8/2005
(Continued)

OTHER PUBLICATIONS

Search Report filed in EP 14 16 4196 mailed Oct. 1, 2015.
(Continued)

*Primary Examiner* — Josh Skroupa
(74) *Attorney, Agent, or Firm* — Rankin, Hill & Clark LLP

(57) ABSTRACT

A drive device includes a drive device housing with a longitudinal axis, at least one gearing assembly received in the drive device housing, with a gearing housing, which is received in the drive device housing so as to be rotatable about the longitudinal axis thereof, an engagement element received in the drive device housing and connected thereto for rotation therewith with respect to a rotation about the longitudinal axis thereof when torque is transmitted through the engagement element, the engagement element including an end face running substantially orthogonally to the longitudinal axis, which end face is in frictional and, if desired, additionally interlocking engagement with an associated counter end face of the gearing assembly or one of the plurality of gearing assemblies, and a spring, which is received in the drive device housing and prestresses the end face and the counter end face against one another.

12 Claims, 6 Drawing Sheets

(51) Int. Cl.
*F16D 43/202* (2006.01)
*F16D 43/21* (2006.01)
*F16H 35/10* (2006.01)
*E05F 15/611* (2015.01)

(52) U.S. Cl.
CPC ....... *F16D 43/2024* (2013.01); *F16D 43/213* (2013.01); *F16H 35/10* (2013.01); *E05Y 2201/216* (2013.01); *E05Y 2201/238* (2013.01); *E05Y 2201/72* (2013.01); *E05Y 2900/546* (2013.01)

(56) References Cited

U.S. PATENT DOCUMENTS

| | | | | |
|---|---|---|---|---|
| 3,811,513 | A | * | 5/1974 | Wezel et al. .............. 192/55.1 |
| 4,368,784 | A | * | 1/1983 | Wunsch et al. ........... 192/56.61 |
| 4,576,270 | A | * | 3/1986 | Baltz et al. ................ 192/150 |
| 4,641,551 | A | * | 2/1987 | Pascaloff ................... 475/263 |
| 4,869,139 | A | | 9/1989 | Gotman |
| 4,980,591 | A | * | 12/1990 | Takanashi ........... F16D 43/2024 192/223.1 |
| 4,991,473 | A | * | 2/1991 | Gotman ..................... 81/475 |
| 8,375,814 | B2 | * | 2/2013 | Hillen et al. ................ 192/55.1 |
| 8,382,595 | B2 | * | 2/2013 | Lonergan, III ......... F16D 7/044 464/38 |
| 9,046,134 | B2 | * | 6/2015 | Johnson ................ F16D 7/044 |
| 2004/0107537 | A1 | | 6/2004 | Ahn |
| 2004/0216273 | A1 | | 11/2004 | Kang |
| 2006/0287157 | A1 | | 12/2006 | Katoh |
| 2008/0271575 | A1 | * | 11/2008 | Hsieh ..................... F16D 7/044 81/121.1 |
| 2010/0186528 | A1 | | 7/2010 | Hillen |

FOREIGN PATENT DOCUMENTS

| | | | | |
|---|---|---|---|---|
| DE | 102007020826 | | 11/2008 | |
| GB | 710538 | * | 6/1954 | .......... F02N 15/063 |
| GB | 2131122 | A * | 6/1984 | ............ F16D 7/044 |
| KR | 2002 0035553 | | 5/2002 | |

OTHER PUBLICATIONS

German Search Report dated Apr. 8, 2016.

* cited by examiner

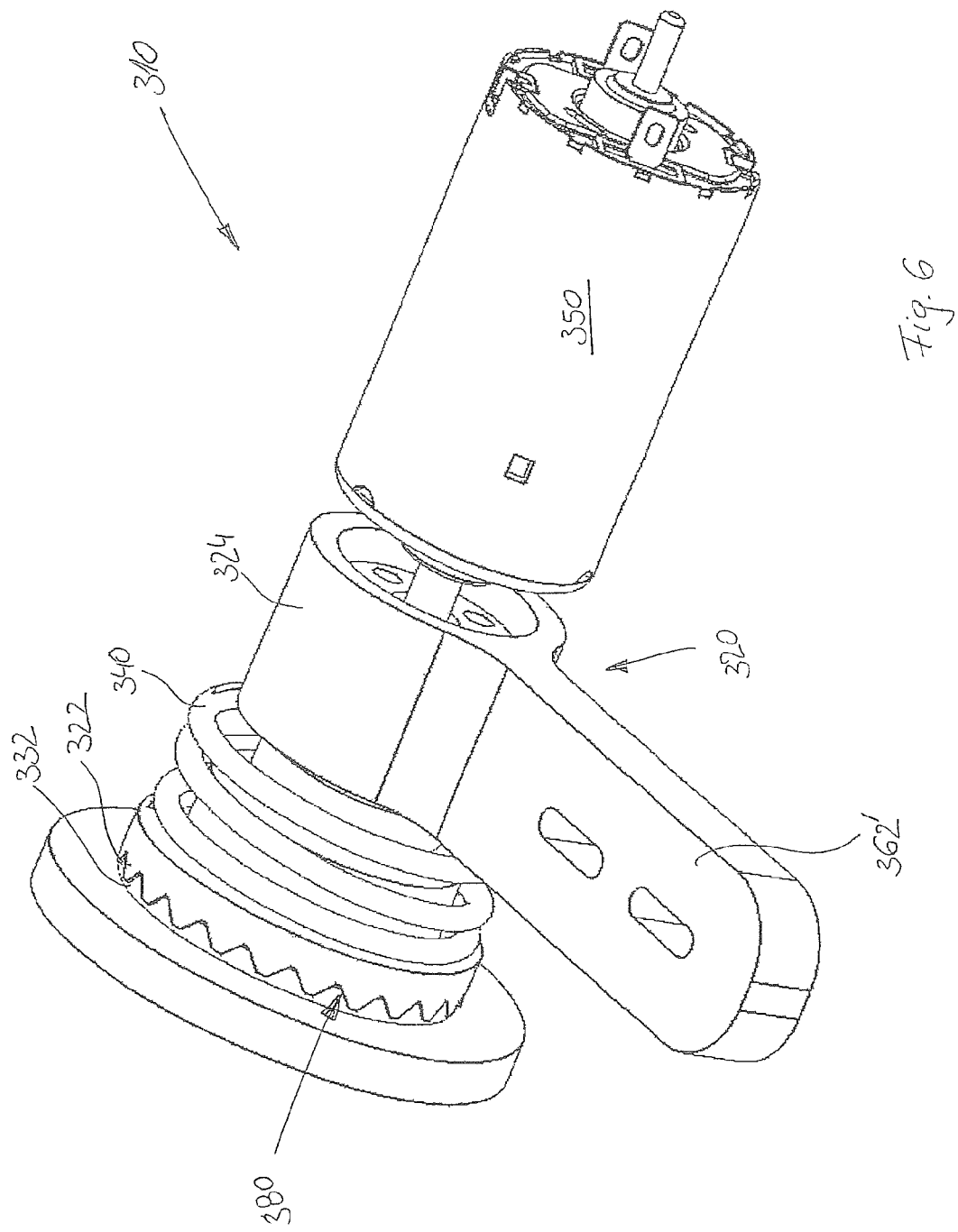

DRIVE DEVICE WITH OVERLOAD PROTECTION

The invention relates to a drive device configured with an overload protection. Drive devices of this type are, for example, used in motor vehicles as tailgate drives, and specifically both in the configuration as spindle drives and as direct drives.

A drive device with overload protection is, for example, known from DE 10 2009 011 184A1. A motor assembly and a gearing assembly arranged downstream of the latter on the output side is received in a drive device housing of the known drive device. An overload protection means is furthermore arranged between the output element of the gearing assembly and the output shaft of the drive device in the drive device housing. The known drive device has a structure that is very complex overall.

It is therefore the object of the present invention to provide a drive device, which is configured with an overload protection and has a simpler and therefore more economically producible structure.

This object is achieved according to the invention by a drive device, comprising a drive device housing with a longitudinal axis, at least one gearing assembly, which is received in the drive device housing, with a gearing housing, which is received in the drive device housing so as to be rotatable about the longitudinal axis of the drive device housing, an engagement element, which is received in the drive device housing and connected thereto for rotation therewith with respect to a rotation about its longitudinal axis and which comprises an end face running substantially orthogonally with respect to the longitudinal axis, wherein the end face of the element is in frictional and, if desired, additionally interlocking engagement with an associated counter end face of the gearing assembly or one of the plurality of gearing assemblies, and a spring, which is received in the drive device housing and prestresses the end face and the counter end face against one another.

If the drive device according to the invention is compared with the known drive device it is established that in the drive device according to the invention at most two components are required to provide the overload protection, namely the engagement element having the end face and the spring prestressing the end face and the counter end face against one another.

In contrast, in the known drive device, an overload protection assembly constructed from a large number of components is provided. The substantially smaller number of components is in particular made possible in that the engagement element having the end face is connected to the drive device housing for rotation therewith with respect to a rotation about the longitudinal axis thereof and in that the gearing housing of the gearing assembly is received in the drive device housing so as to be rotatable about the longitudinal axis of the drive device housing. As a result, the gearing housing, after the triggering of the overload protection, i.e. after the end face and counter end face have disengaged, can freely rotate in the drive device housing about the longitudinal axis thereof, resulting in the fact that the gearing assembly can no longer fulfil its gearing function. In the known drive device, two separate components are necessary for a comparable decoupling, which are also contained in the overload protection assembly configured separately from the gearing assembly. Only the inclusion of the gearing assembly, more precisely the gearing housing, in the overload protection function allows the simplification according to the invention and more economical production of the drive device.

For a first embodiment, in which the spring acts on a separate engagement element, in which two additional components are thus provided to provide the overload protection, it is proposed that the spring is supported at one end on the drive device housing or a part connected thereto in an operationally secure manner and, on the other end, on the engagement element.

To further reduce the number of additional components necessary to provide the overload protection function, according to a second embodiment it may be provided that the spring is supported at one end on the drive device housing or a part connected thereto in an operationally secure manner and, at the other end, on the gearing housing. As the drive device housing or the part connected thereto in an operationally secure manner takes on the function of the engagement element, a separate engagement element can be dispensed with in this embodiment so the spring is the only additional component that has to be provided in order to provide the overload protection function.

According to a first variant of the second embodiment, it may be provided that the gearing housing can be displaced relative to at least one part of the remaining components of the gearing assembly in the direction of the longitudinal axis. As a result, the gearing function can be put out of operation in that the gearing housing is allowed to rotate relative to the drive device housing. For example, it may be provided that the ring gear together with the associated planetary gears can be displaced relative to the drive device housing in the direction of the longitudinal axis. In this case, a displacement between the planetary gears and the planetary axes takes place upon an overload.

According to a second variant of the second embodiment it may, however, also be provided that the gearing assembly can be displaced as a unit relative to the drive device housing in the direction of the longitudinal axis. In this second variant, a relative displacement also takes place between the output element of the motor assembly and the input element of the gearing assembly and between the output element of the gearing assembly and the output shaft of the drive device.

According to a third variant of the second embodiment, it is finally also conceivable for a component of the gearing assembly that is different from the gearing housing to be displaceable relative to at least a part of the remaining components of the gearing assembly in the direction of the longitudinal axis.

If the drive device has a large number of gearing assemblies, it is advantageous if the counter end face is configured on the gearing assembly that is closest to the output shaft of the drive device, and specifically on the side thereof located closer to the output shaft of the drive device. In this case, the selection torque of the drive device corresponds to the triggering torque of the overload protection. This does indeed require a correspondingly robustly configured spring, which is not, however, a structural drawback, as there is generally sufficient installation space for a robustly configured spring. If the counter end face was provided at a position located further away from the output shaft of the drive device, on the one hand, the reduction ratio of the gearing assemblies or gearing stages located between the output shaft and the counter end face would have to be considered and, on the other hand, the efficiency thereof. Taking into account the two effects, the spring could, on the one hand, be configured to be weaker but, on the other hand, the tolerance range of the selection torque of the drive device would also increase as a result, as the tolerance range of the spring would be increased by these two effects.

If the structural configuration of the plurality of gearing stages arranged between the motor assembly and the output shaft of the drive device requires a division of these gearing stages into a plurality of gearing assemblies, for example because the gearing housing of the gearing stage closest to the output shaft has to be produced from a more robust material, for example metal, than the gearing housing of the other gearing assembly or gearing assemblies, which, for example, can be produced from plastics material, it is advantageous with regard to the production costs if the counter end face is arranged between two of the plurality of gearing assemblies.

Furthermore it may be provided that the spring, if the drive device has a plurality of drive assemblies, is arranged between two of the drive assemblies. Basically, however, it is also conceivable for it to be arranged between the motor assembly and the gearing assembly closest to the motor assembly.

In all the embodiments and embodiment variants, it is basically conceivable for the overload protection function to be provided purely by a frictional connection of the end face and counter end face. To more easily achieve the desired triggering torque values, it is, however, preferred if an interlocking fit is also added to the frictional connection. This may, for example, be provided in that the end face and the counter end face are configured with elevations and depressions, which have mutually cooperating oblique faces.

These elevations and depressions may, for example, be in the form of end toothings. During normal operation of the drive device, the prestressing force of the spring is so great that the torque delivered by the gearing assembly is transmitted because of the interlocking fit of the elevations and depressions. In this case, the transmittable torque depends on the level of the prestressing force of the spring, on the angle of the oblique faces and on the coefficient of static friction of the surfaces of the oblique faces. Apart from the frictional effect, an interlocking effect is therefore also present. If the prestressing force of the spring is no longer sufficient to maintain the frictional or frictional/interlocking fit, i.e. if the static friction between the end face and counter end face is overcome by the torque acting on it, the end face and counter end face disengage and the overload protection is triggered.

However, the elevations can also be configured in the form of rolling bodies which, for example prestressed by a spring, engage in the depressions. According to a further alternative, the elevations and depressions may be provided in the form of rolling body rings prestressed against one another or the like.

The type according to the invention of provision of an overload protection is not limited to a special type of gearing. Basically, it can be realised in any desired type of gearing. However, its use is advantageous, in particular, in conjunction with planetary gearings or/and eccentric gearings or/and wobble gearings or/and cycloidal gearings or/and shaft ring gearings.

In the case of eccentric gearings or/and wobble gearings or/and cycloidal gearings, a plurality of gearing gears, for example eccentric gears or/and cycloidal gears or/and wobble gears, can furthermore be used to reduce the bending forces, which act on the eccentric shaft on the drive side, which is in engagement with these gearing gears.

It should be added that the spring can advantageously be configured as a helical compression spring. This is advantageous, in particular in view of the accommodation of the spring in the constricted available installation space in the drive device. Moreover, the force transmission can take place by simply resting the spring on the components having the end face and the counter end face. The use of plate springs, rubber springs or similar other types of spring is also conceivable.

The invention will be described in more detail below with the aid of the accompanying drawings using embodiments. In the drawings:

FIG. 6 shows a perspective view of a part of the components of the drive device of FIG. 5.

Figure 1:
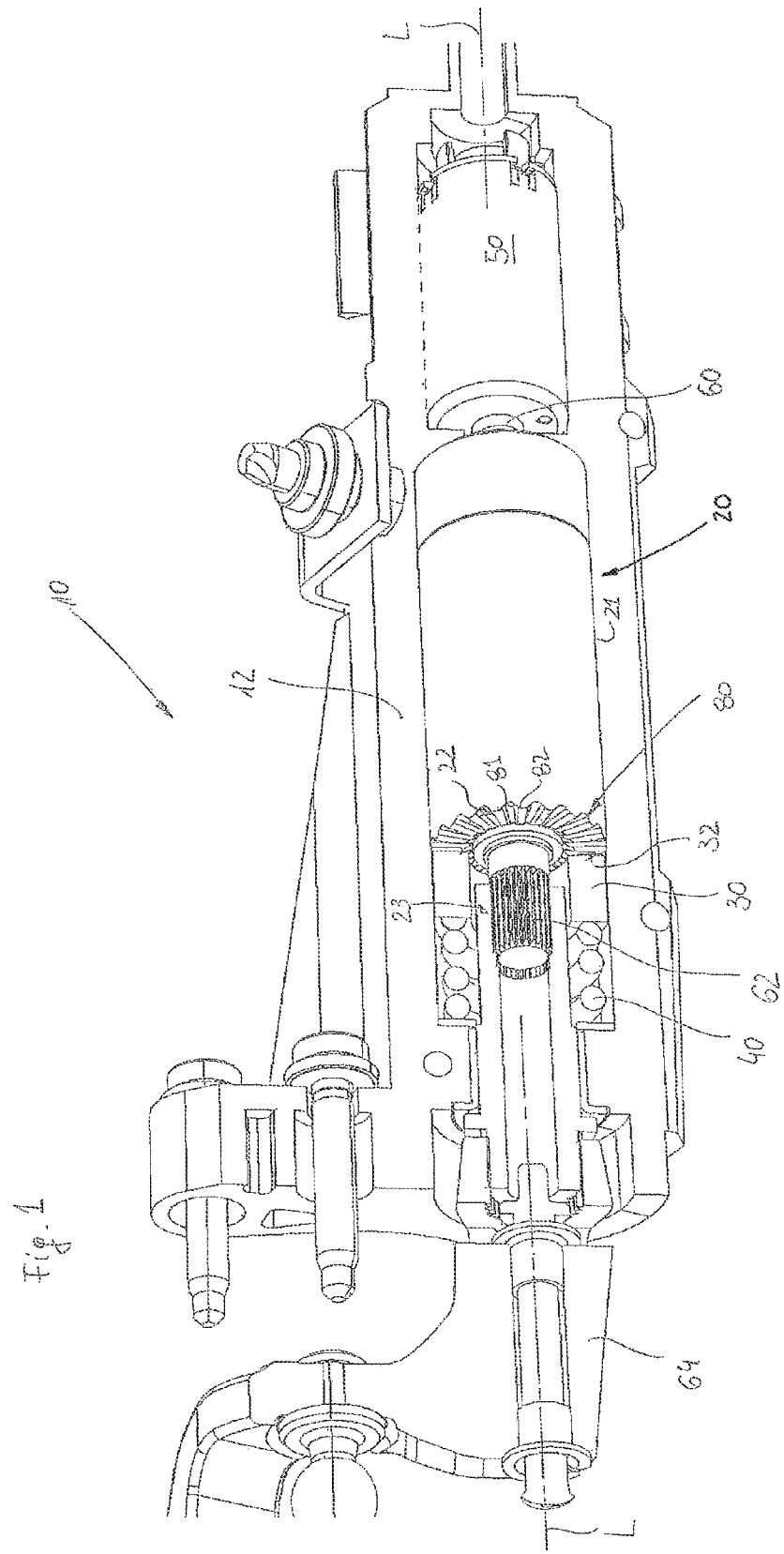
FIG. 1 shows a partially sectional perspective view of a first embodiment of a drive device according to the invention.

In FIG. 1, a first embodiment of a drive device according to the invention is designated by reference numeral 10 in general. The drive device 10 comprises a drive device housing 12 with a longitudinal axis L. A motor assembly 50 and a gearing assembly 20 arranged downstream thereof on the output side is received in the drive device housing 12. The gearing assembly 20 has a gearing housing 21, which is received in the drive device housing 12 so as to be rotatable about the longitudinal axis L thereof. Reference numerals 60 and 62 designate the input shaft (drive shaft) and the output shaft of the gearing assembly 20.

An engagement element 30 and a spring 40 are furthermore arranged on the output side of the gearing assembly 20 in the drive device housing 12. The engagement element 30 is connected to the drive device housing 12 by means of projections 13 (see FIG. 2), which are received and guided in axially running longitudinal grooves (not shown) of the drive device housing 12, for rotation therewith with respect to a rotation about the longitudinal axis L of the drive device housing 12, but displaceably relative to the latter in the direction of the longitudinal axis L.

The engagement element 30 comprises an end face 32, which runs substantially orthogonally with respect to the longitudinal axis L of the drive device housing 12. The spring 40 holds the end face 32 of the engagement element 30 in frictional or interlocking engagement with an associated counter end face 22 of the gearing assembly 20. The engagement element 30, the spring 40 and the cooperating end faces 32 and 22 together provide the overload protection.

Figure 2:
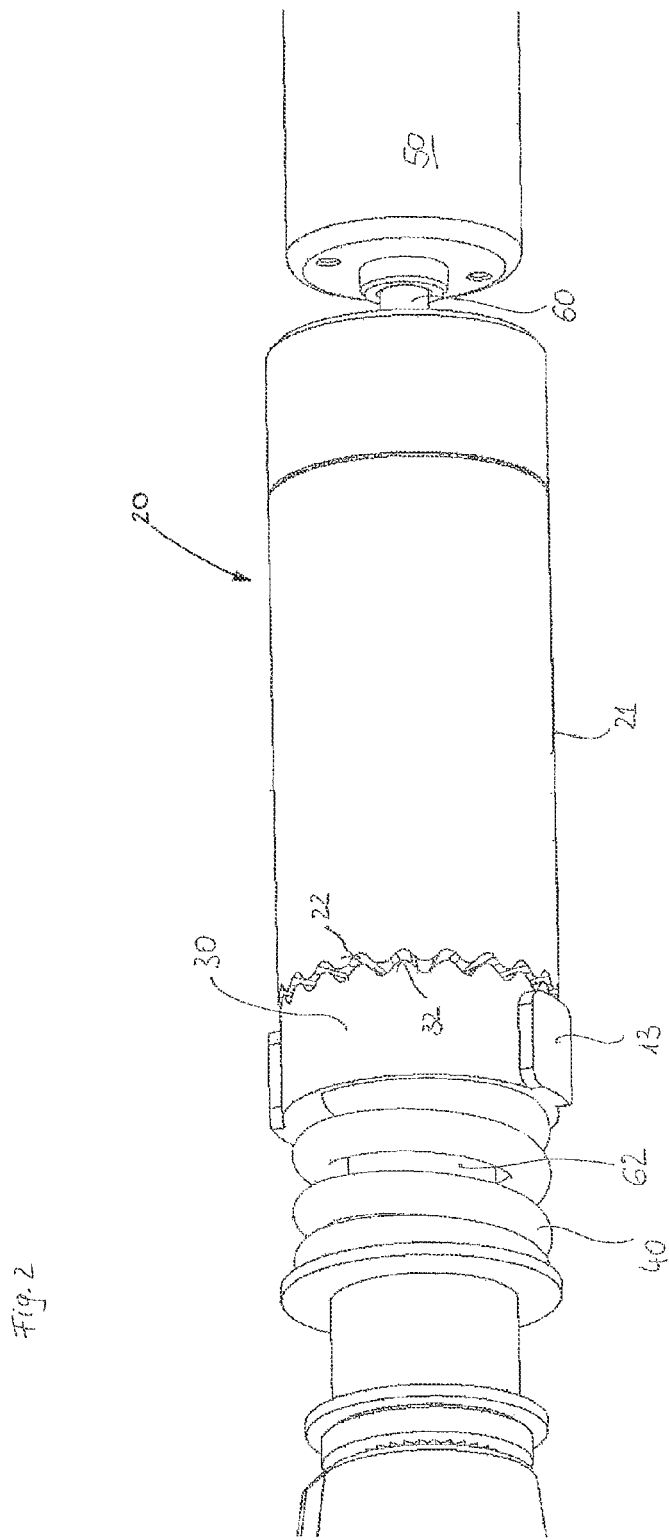
FIG. 2 shows a perspective view of a part of the components of the drive device of FIG. 1.

In the embodiment shown in FIGS. 1 and 2, the overload protection function is realised by a frictional connection of the end face 32 and counter end face 22 combined with an interlocking fit between the two faces 32 and 22. The advantages of an (additional) interlocking connection are a reduction in the required spring prestressing force (surface prestressing) whereby the influence of the friction factor is reduced.

To realise the interlocking fit, the end face 32 and the counter end face 22 are configured with elevations 81 and depressions 82, which have mutually cooperating oblique faces. These elevations 81 and depressions 82 together form an overload protection toothing 80, specifically in the form of an end toothing in the specific embodiment.

During normal operation of the drive device 10, the prestressing force of the spring 40 is so great that the end face 12 is held in frictional and, if desired, additionally interlocking engagement with the associated counter end face 22. Owing to this engagement, the gearing housing 21 is non-rotatably held relative to the drive device housing 12, so the gearing assembly 20 can carry out its gearing function, which leads to the rotation of the output shaft 62.

If the overload protection is triggered, the end face 32 and the counter end face 22 disengage, so the gearing housing 21 or the gearing assembly 20 as a whole can rotate about the longitudinal axis L. Consequently, the gearing assembly 20 can no longer carry out its gearing function.

In the embodiment shown in FIGS. 1 and 2, the spring 40 acts on the engagement element 30, it being supported, on one end, on the drive device housing 12 and, on the other end, on the engagement element 30. The overload protection is realised by the cooperation of these components.

Figure 3:
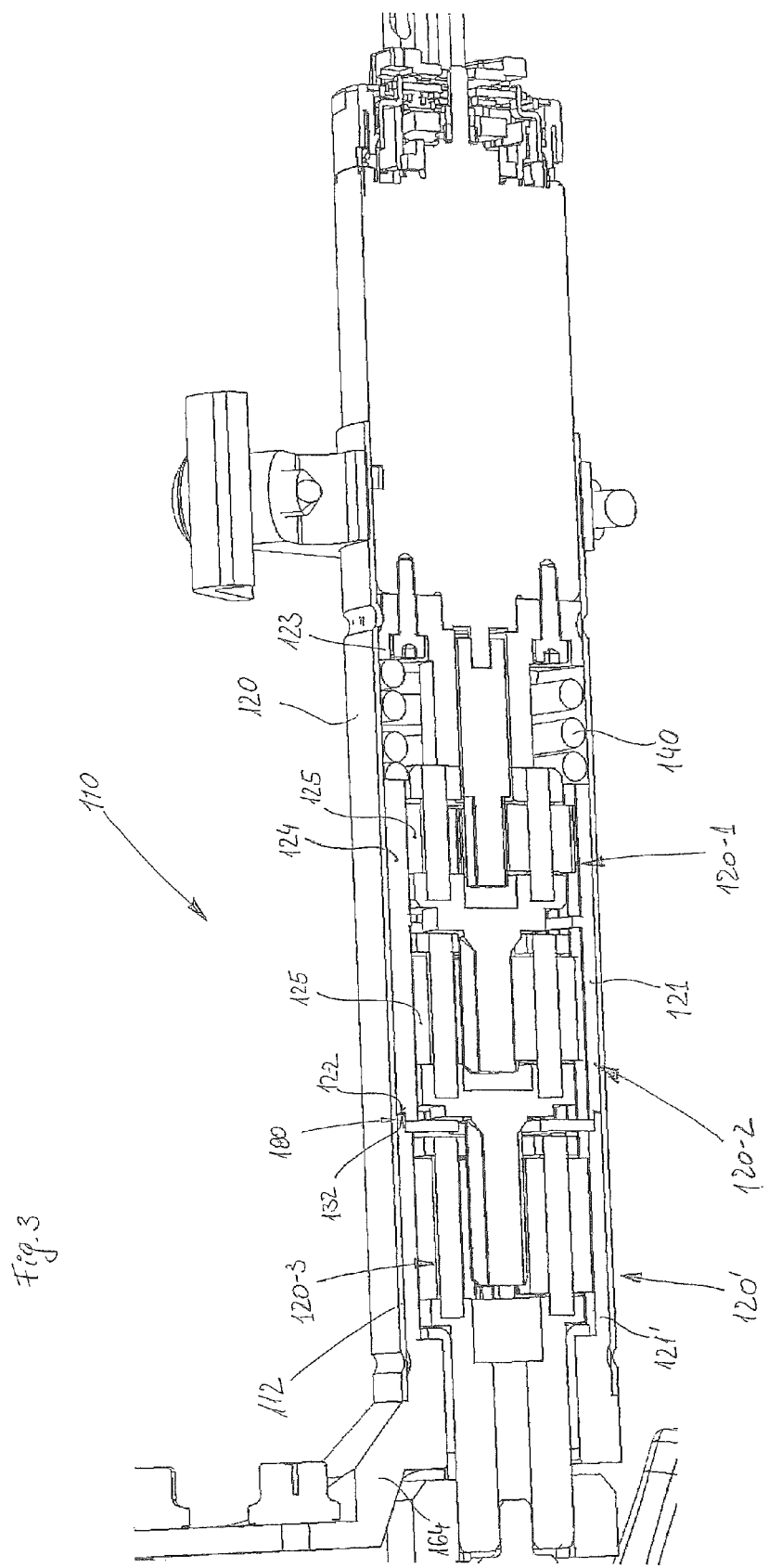
FIG. 3 shows a sectional perspective view of a second embodiment of the drive device according to the invention.

FIG. 3 shows a second embodiment of a drive device according to the invention, which substantially corresponds to the drive device according to FIGS. 1 and 2. Therefore, analogous parts in FIG. 3 are provided with the same reference numerals as in FIGS. 1 and 2 but increased by the number 100. The drive device 110 according to FIG. 3 is only described below to the extent that it differs from the embodiment according to FIGS. 1 and 2, reference being herewith otherwise expressly made to the description of the embodiment according to FIGS. 1 and 2.

The main difference between the drive device 110 according to FIG. 3 and the drive device 10 according to FIGS. 1 and 2 is that it manages with a smaller number of components required to provide the overload protection function. In particular, only the spring 140 is necessary as the additional component for this. This becomes possible in that the gearing housing 121 of the gearing assembly 120 does not cooperate with a separate engagement element to provide the overload protection, but with the drive device housing 112 or a drive holder 164 connected thereto in an operationally secure manner.

In the specific embodiment of FIG. 3, the end face 132 is configured on the drive holder 164, while the counter end face is configured on the gearing housing 121. Furthermore, the spring 140 is supported with one end thereof on the drive device housing 112 or a part 123 connected thereto in an operationally secure manner, while the other end thereof is supported on the gearing housing 121.

The drive device 110 from FIG. 3 overall has three gearing stages 120-1, 120-2 and 120-3, configured in each case as a planetary gearing. In this case, the gearing stages 120-1 and 120-2 together form the gearing assembly 120, while the gearing stage 120-3 forms a further gearing assembly 120', the gearing housing 121' of which is integrally formed with the drive holder 164 and carries the end toothing 132.

As is easily seen when observing FIG. 3, it would basically also have been possible to combine all the three gearing stages 120-1, 120-2 and 120-3 in a single gearing assembly. The division into two gearing assemblies 120 and 120' is, in the present case however, dependent on the design, as it has been found in the configuration of the drive device 120 that smaller strength requirements exist for the gearing housing of the first two gearing stages 120-1 and 120-2 than for the gearing housing of the third gearing stage 120-3. Specifically, the gearing housing 121 may be produced from plastics material, while the gearing housing 121' is preferably produced from metal. The separation that is present in any case of the two housings was used according to the invention in order to also configure the overload protection toothing 180 of the end face 132 and counter end face 122 simultaneously at the separation point.

According to the above, the gearing housing 121 in the embodiment according to FIG. 3 has two functions. Firstly it is used to receive the components required to achieve the gearing function, while it simultaneously serves as a function element when achieving the gearing function, namely as a ring gear 124 of the planetary gearing. And secondly it serves as a switching element that can be displaced in the longitudinal direction L to provide the overload protection function.

In an embodiment variant, not shown, the gearing housing 121 could also be displaced together with the planetary gears 125 of the gearing stages 120-1 and 120-2 in the longitudinal direction L. In this case, the displacement takes place between the planetary gears 125 and their axes. Finally, it is also conceivable to displace the entire gearing assembly 120 in the longitudinal direction L.

Figure 4:
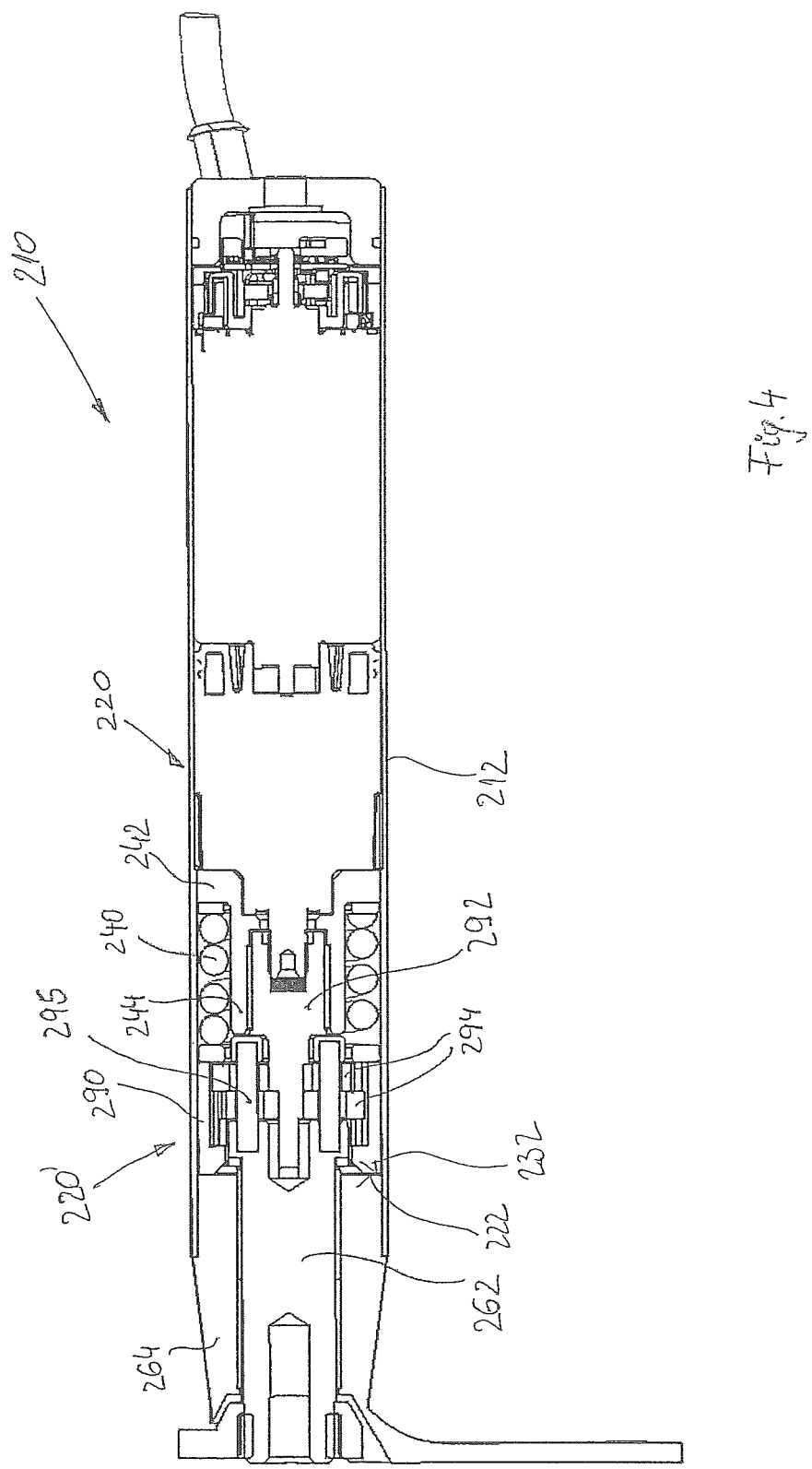
FIG. 4 shows a sectional view of a third embodiment of the drive device according to the invention.

FIG. 4 shows a third embodiment of a drive device according to the invention, which substantially corresponds to the drive device according to FIG. 3. Therefore, analogous parts are provided in FIG. 4 with the same reference numerals as in FIG. 3, but increased by the number 100, i.e. increased by the number 200 in relation to FIGS. 1 and 2. The drive device 210 according to FIG. 4 will therefore only be described below to the extent that it differs from the embodiment according to FIG. 3, whereby reference is otherwise herewith expressly made to the description of the embodiment according to FIG. 3 including the reference to the description of the embodiment according to FIGS. 1 and 2.

The drive device 210 according to FIG. 4, like the drive device 110 according to FIG. 3, has two gearing assemblies 220 and 220', the gearing assembly 220 in turn being able to contain two gearing stages, while the gearing assembly 220' only comprises one gearing stage.

The drive device 210 according to FIG. 4 differs from the drive device 110 according to FIG. 3, however, with regard to the following points: Firstly, the spring 240 is arranged between the two gearing assemblies 220 and 220'. Secondly, the gearing assembly 220' located closer to the output shaft 262 forms the gearing assembly in the sense of the claims. And thirdly, the gearing assembly 220' is configured as an eccentric gearing.

According to the above, the overload protection toothing 280 is configured between the ring gear 290 of the gearing assembly 220', which carries the counter end face 222, and the drive holder 264, which carries the end face 232. The engagement between the end face 232 and counter end face 222 is secured by the spring 240, which is supported with the end thereof remote from the ring gear 290 on the gearing assembly 220 connected to the drive device housing 212 in an operational secure manner and is guided by a receiving bush 242. Provided between the spring 240 and the ring gear 290 is furthermore a protection disc 244. Upon an overload, the ring gear 290, if desired together with the eccentric gears 294, is displaced in the longitudinal direction L.

It is to be added that in the embodiment shown in FIG. 4, two eccentric gears 294 are provided, which are arranged offset by 180° on the eccentric shaft 92. The bending stress of the eccentric shaft 292 can be reduced by this.

Figure 5:
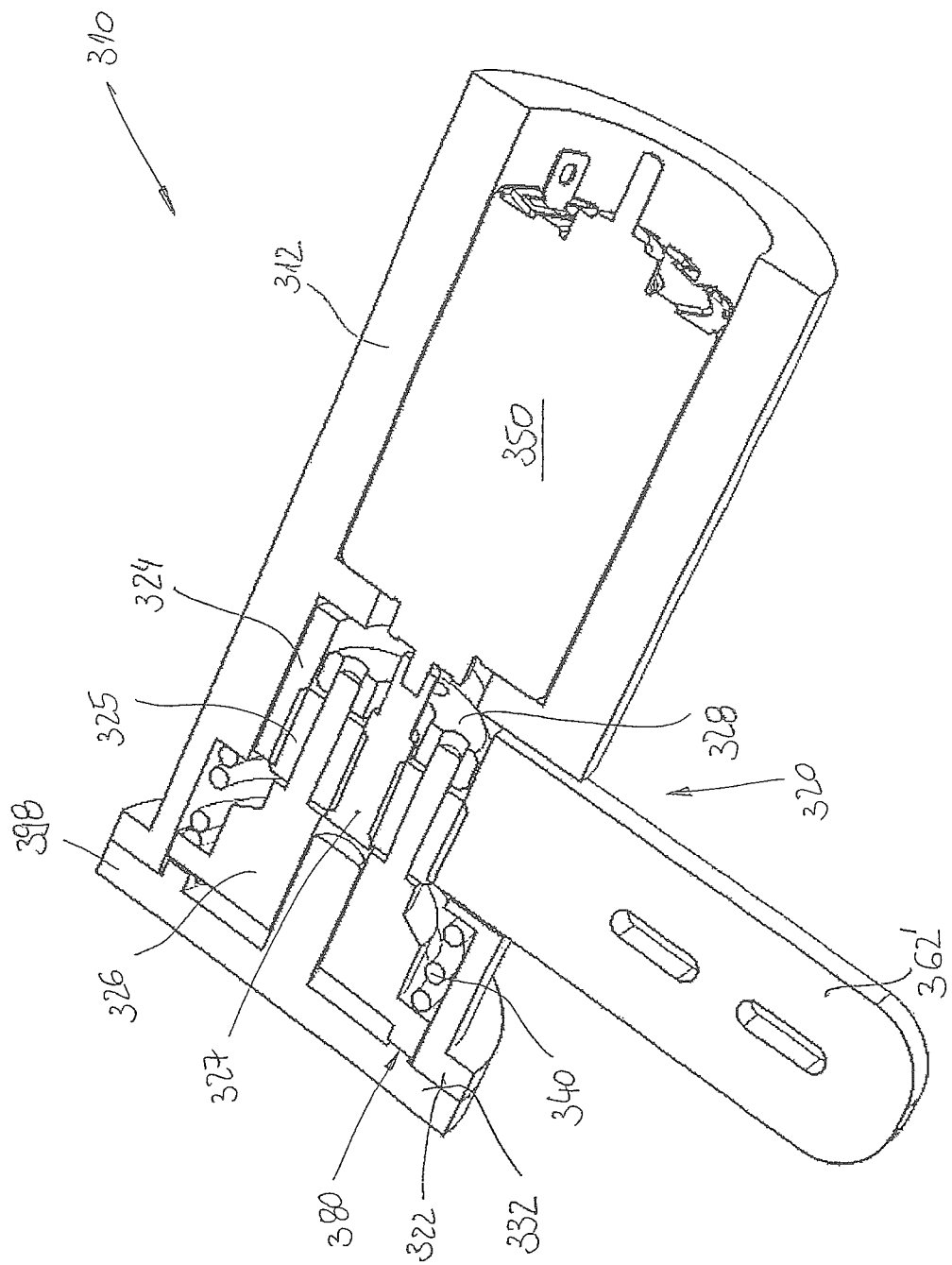
FIG. 5 shows a sectional perspective view of a variant of the third embodiment of the drive device according to the invention.

FIGS. 5 and 6 show a fourth embodiment of a drive device according to the invention, which substantially corresponds to the drive device according to FIGS. 1 and 2. Therefore, analogous parts are provided in FIGS. 5 and 6 with the same reference numerals as in FIGS. 1 and 2, but increased by the number 300. The drive device 310 according to FIGS. 5 and 6 will therefore only be described below to the extent that it differs from the embodiment according to FIGS. 1 and 2, reference otherwise being expressly made herewith to the description of the embodiment according to FIGS. 1 and 2.

The drive device 310 according to FIGS. 5 and 6 differs from the drive device 10 according to FIGS. 1 and 2 above all in that the ring gear 324 is used as a gearing output 362'.

The gearing assembly 320 is realised as a planetary gearing and, apart from the ring gear 224, comprises planetary gears 325, which are mounted on the planetary carrier 326, as well as a sun gear 327, which is connected to the motor assembly 350 in an operationally secure manner. A slide ring or a protection cap 328 is attached to the planetary axles of the planetary carrier 326.

The overload protection spring 340 is supported with one end thereof on the drive device housing 312 and with the other end thereof on the planetary carrier 326. The overload protection toothing 380 is configured between an end plate 398, which is operationally securely connected to the drive device housing 312 and carries the end face 332, and the planetary carrier, which carries the counter end face 322.

The invention claimed is:

1. A drive device, comprising:
    a drive device housing with a longitudinal axis,
    at least one gearing assembly received in and completely enclosed by the drive device housing, the at least one gearing assembly including a gearing housing having a counter end face, the gearing housing completely received in the drive device housing so as to be rotatable about the longitudinal axis of the drive device housing,
    an engagement element received in the drive device housing and connected thereto for rotation therewith with respect to a rotation about its longitudinal axis when torque is transmitted through the engagement element, said engagement element comprising an end face running substantially orthogonally to the longitudinal axis, wherein the end face of the engagement element is in frictional engagement with the counter end face of the gearing housing, and
    a spring, which is received in the drive device housing and prestresses the end face and the counter end face against one another.

2. A drive device according to claim 1, wherein the spring is supported at one end on the drive device housing or a part connected thereto in an operationally secure manner and, at the other end, is supported on the engagement element.

3. A drive device according to claim 1, wherein the spring is supported at one end on the drive device housing or a part connected thereto in an operationally secure manner and, at the other end, is supported on the gearing housing.

4. A drive device according to claim 3, wherein the gearing housing can be displaced relative to at least one part of remaining components of the gearing assembly in a direction of the longitudinal axis.

5. A drive device according to claim 4, wherein the at least one gearing assembly is displaceable as a unit relative to the drive device housing in the direction of the longitudinal axis.

6. A drive device according to claim 1, wherein a component, which is different from the gearing housing, of the at least one gearing assembly can be displaced relative to at least one part of remaining components of the at least one gearing assembly in the direction of the longitudinal axis.

7. A drive device according to claim 1, wherein the at least one gearing assembly includes a plurality of gearing assemblies, and the counter end face is configured on the gearing assembly located closest to an output shaft of the drive device, and on the side thereof located closer to the output shaft of the drive device.

8. A drive device according to claim 1, wherein the at least one gearing assembly includes a plurality of gearing assemblies, and the counter end face is arranged between two of the plurality of gearing assemblies.

9. A drive device according to claim 1, wherein the end face and the counter end face are configured with elevations and depressions, which have mutually cooperating oblique faces.

10. A drive device according to claim 1, wherein the at least one gearing assembly includes a plurality of gearing assemblies, and the spring is arranged between two of the gearing assemblies.

11. A drive device according to claim 1, wherein the at least one gearing assembly is a planetary gearing or an eccentric gearing or a wobble gearing or a cycloidal gearing or a shaft ring gearing.

12. A drive device according to claim 1, wherein the end face of the engagement element is in frictional and interlocking engagement with the associated counter end face.

* * * * *